US011042753B2

United States Patent
Moore et al.

(10) Patent No.: US 11,042,753 B2
(45) Date of Patent: Jun. 22, 2021

(54) VIDEO INGESTION FRAMEWORK FOR VISUAL SEARCH PLATFORM

(71) Applicant: GOH SOO SIAH, Singapore (SG)

(72) Inventors: Stephen Maurice Moore, Singapore (SG); Jimmy Daniel Moore, Singapore (SG); Larry Patrick Murray, Singapore (SG)

(73) Assignee: GOH SOO SIAH, Singapore (SG)

( * ) Notice: Subject to any disclaimer, the term of this patent is extended or adjusted under 35 U.S.C. 154(b) by 91 days.

(21) Appl. No.: 16/331,317

(22) PCT Filed: Sep. 7, 2017

(86) PCT No.: PCT/SG2017/050450
§ 371 (c)(1),
(2) Date: Mar. 7, 2019

(87) PCT Pub. No.: WO2018/048356
PCT Pub. Date: Mar. 15, 2018

(65) Prior Publication Data
US 2019/0354766 A1   Nov. 21, 2019

Related U.S. Application Data

(60) Provisional application No. 62/384,860, filed on Sep. 8, 2016, provisional application No. 62/384,872, filed on Sep. 8, 2016.

(51) Int. Cl.
*G06K 9/00* (2006.01)
*G06F 16/583* (2019.01)
*G06F 16/783* (2019.01)
(Continued)

(52) U.S. Cl.
CPC ....... *G06K 9/00744* (2013.01); *G06F 16/583* (2019.01); *G06F 16/7328* (2019.01);
(Continued)

(58) Field of Classification Search
CPC .......... G06K 9/00744; G06K 9/00765; G06K 9/344; G06F 16/5838; G06F 16/7328
See application file for complete search history.

(56) References Cited

U.S. PATENT DOCUMENTS 5,568,571 A    10/1996   Willis
7,246,314 B2 *  7/2007   Foote ................. G06K 9/00758
                                            715/700
(Continued)

FOREIGN PATENT DOCUMENTS

CN         103186538 A          7/2013
CN         103927387   *         7/2014   ......... G06F 15/5838
(Continued)

OTHER PUBLICATIONS

International Report on Patentability for corresponding application PCT/SG2017/050450 filed Sep. 7, 2017; dated Aug. 7, 2018.
(Continued)

*Primary Examiner* — Myron Wyche
(74) *Attorney, Agent, or Firm* — Cantor Colburn LLP

(57) ABSTRACT

This invention includes a framework and method to enable the transformation of video content into a format that allows for mapping and, hence, identification of individual sections (scene segments or otherwise) of the media content. It includes a means of ingesting images and video frames into a database. Consumer products can be matched with the images and/or objects in the images. A consumer can access the content by submitting a digital image taken on a mobile device. One or more objects in the user submitted image can be matched with products and/or commercial/promotional materials.

10 Claims, 5 Drawing Sheets

(51) Int. Cl.
*G06F 16/732* (2019.01)
*G06K 9/34* (2006.01)
*G06F 40/169* (2020.01)

(52) U.S. Cl.
CPC .......... *G06F 16/783* (2019.01); *G06F 40/169* (2020.01); *G06K 9/00765* (2013.01); *G06K 9/344* (2013.01)

(56) References Cited

U.S. PATENT DOCUMENTS

| | | | |
|---|---|---|---|
| 2008/0212932 A1* | 9/2008 | Lee | G06F 16/7844 386/241 |
| 2008/0317353 A1 | 12/2008 | Chien | |
| 2009/0208116 A1* | 8/2009 | Gokturk | G06F 3/04842 382/209 |
| 2011/0085739 A1 | 4/2011 | Zhang | |
| 2012/0076357 A1 | 3/2012 | Yamamoto | |
| 2013/0114890 A1* | 5/2013 | Saund | G06K 9/00442 382/161 |
| 2016/0112600 A1* | 4/2016 | Mashimo | G06K 9/00456 358/3.28 |

FOREIGN PATENT DOCUMENTS

| | | |
|---|---|---|
| CN | 103927387 A | 7/2014 |
| EP | 2224357 A1 | 9/2010 |

OTHER PUBLICATIONS

International Search Report for corresponding application PCT/SG2017/050450 filed Sep. 7, 2017; dated Dec. 13, 2017.

\* cited by examiner

VIDEO INGESTION FRAMEWORK FOR VISUAL SEARCH PLATFORM

FIELD OF THE INVENTION

The invention relates to a networked computerized application, to acquire, process, analyze and ingest video media content so that the content can be accessed by a visual search platform.

BACKGROUND OF THE INVENTION

E-commerce is a transaction of buying or selling online. E-commerce has become an important tool for small and large businesses worldwide, not only to sell to customers, but also to engage them. In 2012, e-commerce sales surpassed $1 trillion.

Internet marketing refers to advertising and marketing efforts that use the Web and e-mail to drive sales via e-commerce. It includes e-mail marketing, search engine marketing (SEM), social media marketing, many types of display advertising (e.g. banner advertising) and mobile advertising. Metadata is a vital component of internet marketing.

Businesses routinely store metadata about searches and transactions which enables them to analyze sales trends, develop marketing plans and make predictions. This same metadata can allow businesses to provide a more personalized shopping experience with features such as purchase history, address books for multiple shipping locations, and product recommendations.

Today, most web pages have metadata embedded in them. Web search engines build up vast indexes that use page text and its attendant metadata to provide relevant search results to users. Metadata can be used for targeted advertising. Advertisers can use sophisticated methods to target the most receptive audiences with certain traits, based on a product that the advertiser is promoting.

Because online shoppers are unable to view items in person, they usually search by criteria such as a keyword. For example, a person could use a web browser to search for airline flights to New Zealand. Metadata in the form of "cookies" from websites visited by him/her is stored on the computer by a user's web browser. Cookies are sent back and forth between an internet server and the browser which allows the user to be identified and/or to track his/her activities. Thereafter, the person could receive advertisements such as banner ads related to travel in New Zealand with hotel, car rental, tour and flight information.

Further, metadata can be used to target users based on demographics. A business may recognize that a product appeals to a certain demographic and marketing can be directed toward that demographic. For example, a banner advertisement for investment securities may be ineffective for a teenage audience. Targeting the advertisement to an older demographic, and more particularly to those seeking retirement, will be more effective. Metadata can be compiled on a user to identify his/her demographic and the likelihood that he/she may be interested in investment securities.

With the advent of a market demonstrating an increasing uptake in visual search use-cases, enrichment of demographic profiling is of great interest and benefit to consumers as well businesses. Organizations can use such models to provide personalized offerings, estimate usage patterns (based on seasonality for example), and help determine future product direction.

Visual based searches are common, particularly with the ubiquity of smart phones and tablet computers. For example, the user in the example above might seek images related to hiking and trekking in New Zealand. Because he/she clicks on images, the browser is unable to record metadata based on keywords typed into the browser. Similarly, he/she may watch video related to attractions in New Zealand. With conventional technology, neither the images nor the video will contribute metadata for targeted marketing.

Given the proliferation and popularity of Internet based video distribution platforms of various architectures, visual search on video content has the potential to tap in to a multi-million user base consisting of content creators, consumers and commercial partners. If specific segments of a video can be identified, interested parties gain the ability to augment and/or partner these sections with additional content. This may take the form of information enrichment for such sections. Commercial partners may wish to target relevant sections as avenues to distribute product offerings.

There is currently no means of effectively creating and extracting metadata based on images viewed by a user. Thus, images viewed/searched cannot be attributed to one's profile for targeted marketing. Also, there is no means of searching based on a captured image without describing it in a text query. Thus, there is no way for a viewer to express interest in an object or product that he/she views in a show or scene. For example, a viewer can see a celebrity with a handbag. However, it may not be apparent where to purchase the handbag. The only option for the viewer is to describe attributes of the handbag in a visual search query.

Attempts have been made to link video and/or print to a website. Using current technology, a vendor or advertiser can include a QR code (Quick Response Code) on a print or video advertisement. A viewer can use a smartphone to scan the QR code which will direct him/her to a website and/or web content. However, this requires a conspicuous block of code to be placed in proximity of the viewer. Further, a separate QR code must be included for each object of interest. For a video, the QR code must be present for its entire duration.

There are obvious limitations with the use of a QR code. Further, marketers are seeking improved methods to engage younger audiences used to ad-skipping and on-demand media usage. Product placement and branded entertainment provides "omni-channel" possibilities to more effectively engage younger and/or tech-savvy consumers. Accordingly, there is a need for a method of allowing a viewer to express interest and/or gain additional information related to objects on images and/or video. The system should allow a user to obtain details and further information on subject matter without conducting a keyword search or scanning a QR code. It should be capable of use with print media (e.g. magazine advertisements) as well as video media (e.g. television).

SUMMARY OF THE INVENTION

A first aspect of the invention is a means of ingesting images from printed media into a database.

A second aspect of the invention is a means of ingesting images from printed media into a database so that objects in the images can be identified and matched with products.

A third aspect of the invention is a means of ingesting images from printed media into a database wherein text and extraneous content is removed.

A fourth aspect of the invention is a means of ingesting segments of video media into a database.

A fifth aspect of the invention is a means of ingesting segments of video into a database wherein video segments are identified by comparing same or similar scenes so that similar segments can be grouped and duplicate segments removed.

A sixth aspect of the invention is a means of ingesting segments of video into a database wherein the resolution and/or frame rate of video is reduced.

A seventh aspect of the invention is a means of ingesting segments of video into a database so that objects in the video segments can be identified and matched with products.

INTRODUCTION

The invention includes a method of compiling images from printed media into a database comprising the steps of (a) obtaining printed media, (b) converting the printed media into digital media, (c) detecting text in the digital media based on connected contours of edges, (e) removing areas with text from the digital media, (f) detecting one or more images in the digital media, (g) determining if sufficient features are present to categorize the one or more images, (h) categorizing the one or more images and (i) inserting the one or more images into a database. The method can include the additional steps of accessing the database when a user submits a query and matching the query with one or more images in the database by comparing features.

The invention also includes a method of compiling frames from video, saving and indexing the frames in a database comprising the steps of (a) obtaining video, (b) analyzing the video for features in frames, (c) separating the video into segments based on features, (d) analysing features of segments to group segments that share features, (e) annotating one or more frames of segments with metadata and (f) saving one or more frames of segments in a database. The method can include the additional step of reducing the frame rate and/or resolution of the video. It can also include the additional steps of accessing the database when a user submits a query and matching the query with one or more frames of the segments in the database based on shared features. Duplicate frames can be identified based on shared content so that one or more of the duplicate frames can be discarded.

The invention also includes a computerized system to ingest documents comprised of (a) a user interface to upload a document to a server, (b) a module comprised of logic to process the document and extract sections from the document as images, (c) a module comprised of logic to remove text from the images, (d) a module comprised of logic to detect features in the images and (e) a module comprised of logic for attaching a unique identifier to the images. The computerized system can also include a means for receiving a query and a module for matching the query with one or more images in the database based on shared features.

Further, the invention includes a computerized system to ingest video comprised of (a) a user interface to upload video to a server, (b) a computer program to process the video and extract sections from the video as images and (c) a database to store the extracted sections. The extracted sections can be analyzed for adherence to suitability parameters, including image features and image resolution. A unique identifier can be attached to each extracted video section. The computerized system can also include a means for receiving a query and a module for matching the query with one or more video sections in the database based on shared features.

DETAILED DESCRIPTION OF THE INVENTION

Definitions

Figure 1:
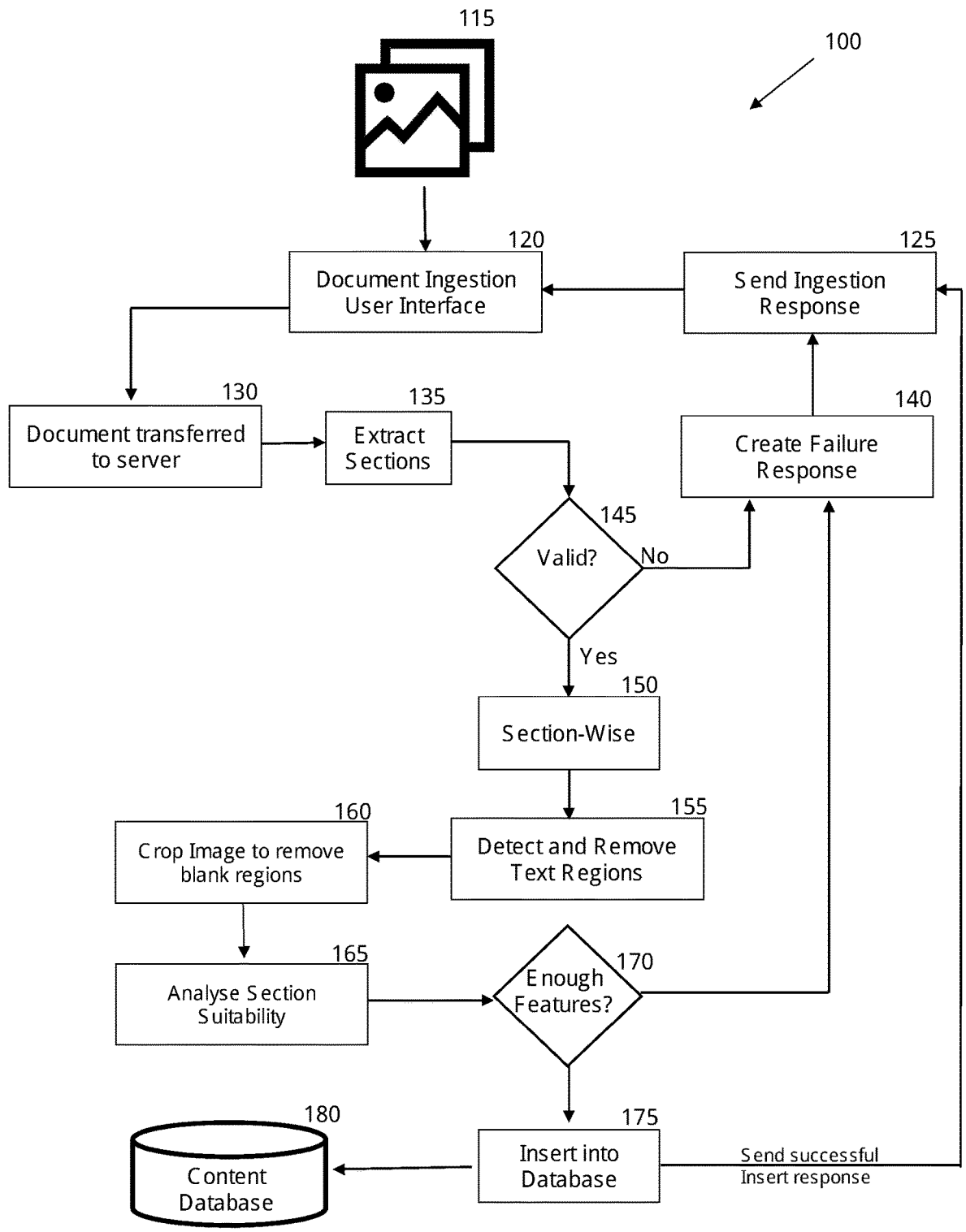
FIG. 1 depicts an exemplary overview of an image ingestion framework.

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The term "app" or "application" refers to a self-contained program or piece of software designed to fulfil a particular purpose, especially as downloaded onto a mobile device.

The term "cookie," "internet cookie" or "HTTP cookie" refers to a small piece of data sent from a website and stored on a user's computer by a user's web browser. Cookies are sent back and forth between an internet server and the browser which allows a user to be identified or to track his/her progressions. Cookies provide detail on what pages a consumer visits, the amount of time spent viewing each page, the links clicked, searches and interactions made. From this information, the cookie issuer gathers an understanding of the user's browsing tendencies and interests generating a profile. Analysing the profile, advertisers are able to create defined audience segments based upon users with similar returned similar information, hence profiles.

The term "clustering" or "cluster analysis" refers to the task of grouping a set of objects in such a way that objects in the same group (called a cluster) are more similar (in some sense or another) to each other than to those in other groups (clusters). It is a main task of exploratory data mining, and a common technique for statistical data analysis, used in many fields, including machine learning, pattern recognition, image analysis, information retrieval, bioinformatics, data compression, and computer graphics.

The term "deep learning" refers to the application to learning tasks of artificial neural networks (ANNs) that contain more than one hidden layer. Deep learning is part of a broader family of machine learning methods based on learning data representations, as opposed to task specific algorithms.

The term "feature vector," in pattern recognition and machine learning, refers to a feature vector is an n-dimensional vector of numerical features that represent some object. Many algorithms in machine learning require a numerical representation of objects, since such representations facilitate processing and statistical analysis. When representing images, the feature values might correspond to the pixels of an image, when representing texts perhaps term occurrence frequencies.

The term "inverted index," "postings file" or "inverted file" is an index data structure storing a mapping from content, such as words or numbers, to its locations in a database file, or in a document or a set of documents (named in contrast to a Forward Index, which maps from documents to content). The purpose of an inverted index is to allow fast full text searches, at a cost of increased processing when a document is added to the database.

The term "k-Nearest Neighbor" or "k-NN" refers to a nearest-neighbor classification object, where both distance metric ("nearest") and number of neighbors can be altered. The object classifies new observations using the predict method. The object contains the data used for training, so can compute re-substitution predictions. Link Analysis The term "module" refers to a self-contained unit, such as an assembly of electronic components and associated wiring or a segment of computer software, which itself performs a defined task and can be linked with other such units to form a larger system.

The term "Multilayer Perception Neural Network" or "MLP" refers to a feedforward neural network with one or more layers between input and output layers. Feedforward means that data flows in one direction from input to output layer (forward). MLPs are widely used for pattern classification, recognition, prediction and approximation. Multi-Layer Perceptron can solve problems which are not linearly separable.

The term "metadata" refers to data that describes other data. It provides information about a certain item's content. An image may include metadata that describes how large the picture is, the color depth, the image resolution and when the image was created. A text document's metadata may contain information about how long the document is, who the author is, when the document was written, and a short summary of the document.

The term "metatag" refers to metadata that is included on web pages. Description and keywords meta tags are commonly used to describe the Web page's content. Most search engines use this data when adding pages to their search index.

The term "QR code" or "Quick Response Code" refers to a matrix barcode (or two-dimensional barcode) that contains information about the item to which it is attached. A QR code includes black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image.

The term "synthetic data" refers to any production data applicable to a given situation that are not obtained by direct measurement.

The term "Support Vector Machine" or "SVM" refers to supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier.

The term "targeted advertising" refers to a form of advertising where online advertisers can use sophisticated methods to target the most receptive audiences with certain traits, based on the product or person the advertiser is promoting. These traits can either be demographic which are focused on race, economic status, sex, age, the level of education, income level and employment or they can be psychographic focused which are based on the consumer's values, personality, attitudes, opinions, lifestyles and interests. They can also be behavioral variables, such as browser history, purchase history, and other recent activity.

Other technical terms used herein have their ordinary meaning in the art that they are used, as exemplified by a variety of technical dictionaries.

Description of Preferred Embodiments

The particular values and configurations discussed in these non-limiting examples can be varied and are cited merely to illustrate at least one embodiment and are not intended to limit the scope thereof.

The invention relates to the assimilation of video content into a visual search platform such that each uniquely distinguishable frame is searchable with the use of a query image of the relevant video segment from a computer sensor system. It includes a means of ingesting images and video frames into a database. Consumer products can be matched with the images and/or objects in the images. A consumer can access the database by submitting a digital image taken on a mobile device. One or more objects in the user submitted image can be matched with products and/or commercial/promotional materials.

One of the benefits of visual search (as opposed to traditional text based search) for demographic profiling is the inherently greater information about the query that can be ascertained. For example, a user may search for brown shoes in a search engine (or e-commerce website). In a visual search use-case, the query image itself can reveal much more about the nature of the user's query. The user can enquire about a very specific kind of brown shoe (shape, style, material, brand, loafers, with laces, etc.) by submitting or clicking on an image of a particular shoe. With access only to a text search query, it is impossible to extract greater granularity about the search object without any further information.

Visual search as a form of user interaction has gained a great deal of traction recently due to advances in the field of machine vision. It is now possible to query databases containing millions of images with a high degree of accuracy. This opens up possibilities of human content interaction. In one such embodiment, it is possible to enrich static media assets by tagging them with augmented reality use cases. In order to access the richer content, a user can point a camera device at the static content and, with the use of a visual matching engine, retrieve and display the content overlay.

Specific segments of a video can be identified so that interested parties gain the ability to augment and/or partner these sections with additional content. This may take the form of information enrichment for such sections. Commercial partners can target relevant sections as avenues to distribute product offerings.

In order to extract metadata about a visual search query, advanced classification algorithms, including but not limited to Deep Learning, Supervised Learning and Unsupervised Learning can be employed. Thus, from an input image, a list of descriptive metadata can be obtained (e.g. shoe, brown, laces, brogue, context, location of manufacture, material and any such information that provides clarity as to the status of the contents within the image).

In one embodiment of the invention, a list of objects that compose an image or video can be extracted and linked to a sequence of frames that are analyzed to correspond to a semantically distinct "topic." For example, data from print images (e.g. magazines) can be entered into the system. The user can submit a digital image of a shoe from a page of the magazine. The system can relay product information on the topic of shoes. In another embodiment, data from video (e.g. television) is entered into the system. A user can submit a screen shot of the video wherein a shoe is one of the items on the screen. The system can relay product information to the user on the topic of shoes.

In order to build and index content in a system, visually rich digital documents, such as magazines, comics or other documents that convey information in a mainly non-textual manner (i.e. documents that include images) can be utilized as described below.

Document Ingestion

A document ingestion user interface provides a gateway to upload a master document into the content database. This interface can provide a means of annotation and metadata population. Uploaded documents can be indexed and stored in a content database 180. Metadata can be attributed to each document.

The steps of document ingestion 100 are detailed in FIG. 1. A document ingestion framework enables the identification of particular segments of the document such as a magazine or journal by the use of a visual query image to drive this identification.

Documents (e.g. scanned pages from a magazine) 115 can be uploaded or "ingested" using a user interface 120. For example, pages of a magazine can be scanned and uploaded in a Portable Document Format (PDF) or other format. Documents are transferred to a server 130 and sections (e.g. individual images) are extracted 135. The system then determines whether a document is valid 145. For example, a document with no discernable images may not be deemed valid. An algorithm can be used to determine whether it fits within a criteria within a certain tolerance. If it is not valid, the system can create a failure response 140. The ingestion response can be sent to the user interface 125 to send an alert or notification.

If the document is valid, the system can break the document into sections 150. For example, similar sections can be grouped together. An annotation tool can be used to enable the document to be segmented. A magazine can be separated into articles, advertisements and promotions. If no segmentation information is provided, the entire document can be processed as a single entity. After segmentation, each segment can processed for ingestion into the content database.

Text regions can be detected and removed 155. Images can be cropped to separate them from blank regions and/or borders on the pages 160. Each section can be analyzed to ensure its suitability 165. For example, the system can detect and identify features. A low resolution, blurred or abstract image (or one with no identifiable features) may be deemed unsuitable. If sufficient features are present 170, it can be inserted into the database 175.

Metadata can be linked to each processed image. Metadata fields can include linked content, document language as well as document author/publisher information.

Database Insertion

Storing each segment into an image/content database 180 can include the following steps:

1) Extraction of visual features from the segment image;
2) Creating an insertion response comprising:
Vector of Visual Features
Unique Segment ID
Linked Content ID
3) Wrapping insertion response into an appropriate transfer format (e.g. JSON);
4) Sending insert response to database;
5) Receiving insertion status; and
6) Propagation of insertion status response to the user interface.

Document Section Extraction

Once the document has been uploaded to the server, a computer program can process this document and partition it into a series of segments.

For example, a digital copy of a magazine can be the originally uploaded document as a PDF. The segments can be designated as each page of the PDF file. The Extraction stage can also evaluate the suitability of each section of the document for further processing. This can take the form of integrity checks that evaluate whether the file is in an appropriate format for ingestion, or if each section falls within safety parameters (such as minimum resolution).

Document Analysis

For each segment that is extracted from the originally uploaded document, a framework is necessary to process and validate the quality of the image to be inserted into the vision system. The framework includes text removal based on connected contours of edges.

One issue with ingesting images from documents is the propensity of text or text-like features to be embedded within the image. In many visual search systems, this can cause a problem in ensuring uniqueness within text-heavy images. Accordingly, it is important to detect, isolate and remove text-rich regions from a composite image that includes imagery and text.

Figure 2:
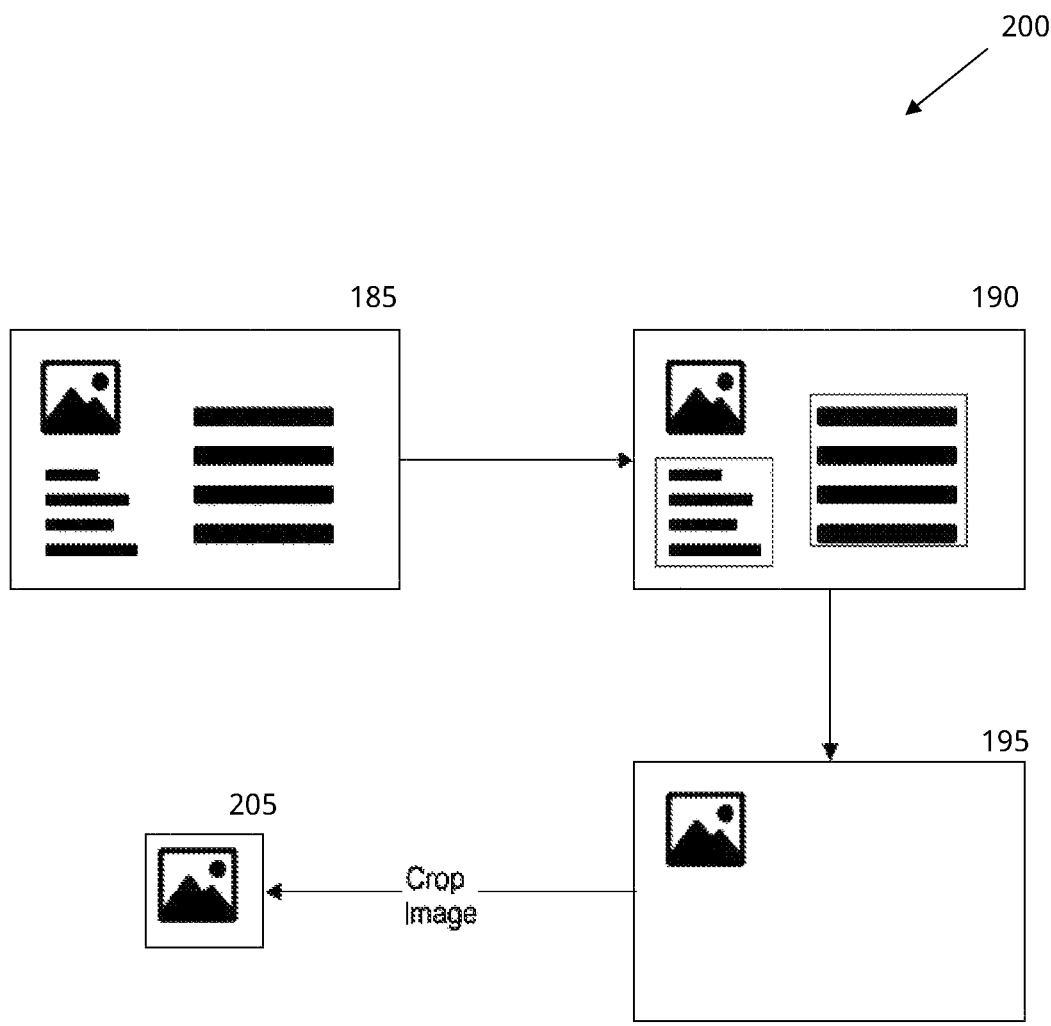
FIG. 2 depicts the steps used by an image cropping algorithm.

FIG. 2 depicts the steps in the function of a text detection and cropping algorithm that can be used to isolate regions of the segment image that contain text. The image can be cropped so that the suboptimal text regions are removed prior to insertion. A typical image 185 from a magazine or journal will contain sections of text. The computer can identify sections of text 190 based on, for example, character recognition and the ordered arrangement of letters into lines and paragraphs (described below). The text-rich areas are removed to leave an isolated image 195. Thereafter, the image can be cropped 205 to remove the excess regions.

Text can also be identified based on connected contours of edges. Text prepared for printing has very pronounced edges, usually much more pronounced than a typical image. High level edges can be preserved, and prepared for contours processing. Detection of contours will isolate words, lines and nearby text. If contours contain more lines, they can be separated into single lines, and after that, filtering is done. Single lines and words are connected and labelled into paragraphs or large single lines. The following principles can be applied to the process of identifying text.

- Edges can be detected on grayscale image using morphology gradient operation.
- Binarization can be achieved using thresholding of the detected edge image using Otsu method (clustering-based image thresholding).
- Morphology closing can be achieved for connecting small objects (letters or words).
- Contours can be found using connected components analysis.
- First filtering can be achieved using width, height and ratio of non-zero pixels in the contour region.
- Vertical projection of contour region can be used to detect if the found contour contains more than one line. In the case of multi-line, threshold of vertical projection can be used to determine where to separate lines.
- Contour regions can be validated and filtered using region area, size, ratio of non-zero pixels in the contour region and some custom made features relative aspect ratio times area (RARA) and relative aspect ratio times average region side size (RARAS).

Connecting and labelling words and lines into paragraphs can be carried out on rectangles which represent bounding boxes of contours region. First rectangles are linked left and right, so that the lines as determined. Then impossible rectangles are deleted. On the end, linking up and down can be performed. The final result consists of determined large rectangles that contain regions deemed to contain paragraph text.

Video Ingestion

Similarly, video content can be compiled and ingested into a content database. This section outlines a system that allows a user to upload video content to a computer program designed to pre-process the video into a format suitable for further analysis and assimilation into a visual search platform. The User Interface (UI) allows the selection of a video source that a user wishes to introduce into the platform. The source can be a file that is accessible remotely or locally from the user's computer device.

Figure 3:
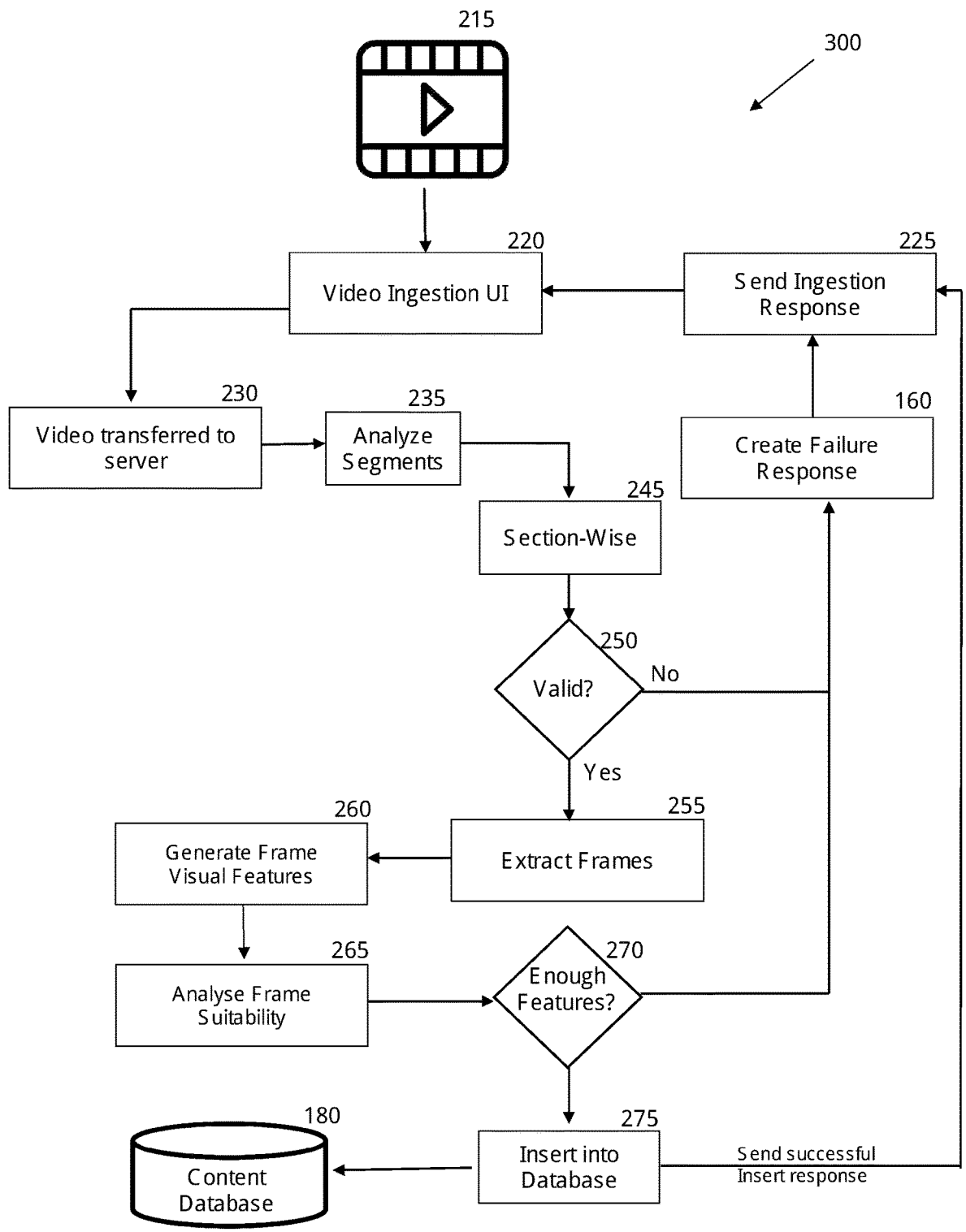
FIG. 3 depicts an exemplary overview of a video ingestion framework.

The interface can also enable annotating video file segments with customizable metadata to be linked with the segment. The interface can also provide a status overview of each segment identified within the video and metrics relating to all analysis and checks performed on the segment, thereby providing immediate feedback on all stage statuses for that segment. FIG. 3 depicts how such an interface can facilitate the transfer and annotation of video and video segments to the visual search platform.

The steps of video ingestion 300 are detailed in FIG. 3. A video ingestion framework enables the identification of particular segments of a video by the use of a visual query image.

Video content (e.g. televised programs) 215 can be uploaded or "ingested" using a user interface 220. Video is transferred to a server 230 and sections are analyzed 235. The video can be further segmented 245. For example, different objects in a scene can indicate a change in setting. The system then determines whether a video segment is valid 250. For example, a video with no identifiable objects can be deemed invalid. An algorithm can be used to determine whether it fits within a criteria within a certain tolerance. If it is not valid, the system can create a failure response 240. The ingestion response can be sent to the user interface 225 to alert the user.

If the video segment is valid, the system can break the video into segments 245. For example, similar sections (based on scene content) can be grouped together. Individual frames can be extracted 255. Visual features can be generated for each frame 260. Each frame can be analyzed to ensure its suitability 265. For example, the system can try to detect and identify objects and features in each frame. A frame with low resolution or that is blurred may be deemed unsuitable. If sufficient features are present 270, the frame can be inserted into the content database (275, 180).

Segment Analysis

The video segment analysis is a component of the video ingestion framework that allows the user to isolate and provide segment specific metadata for the identified segments.

Figure 4:
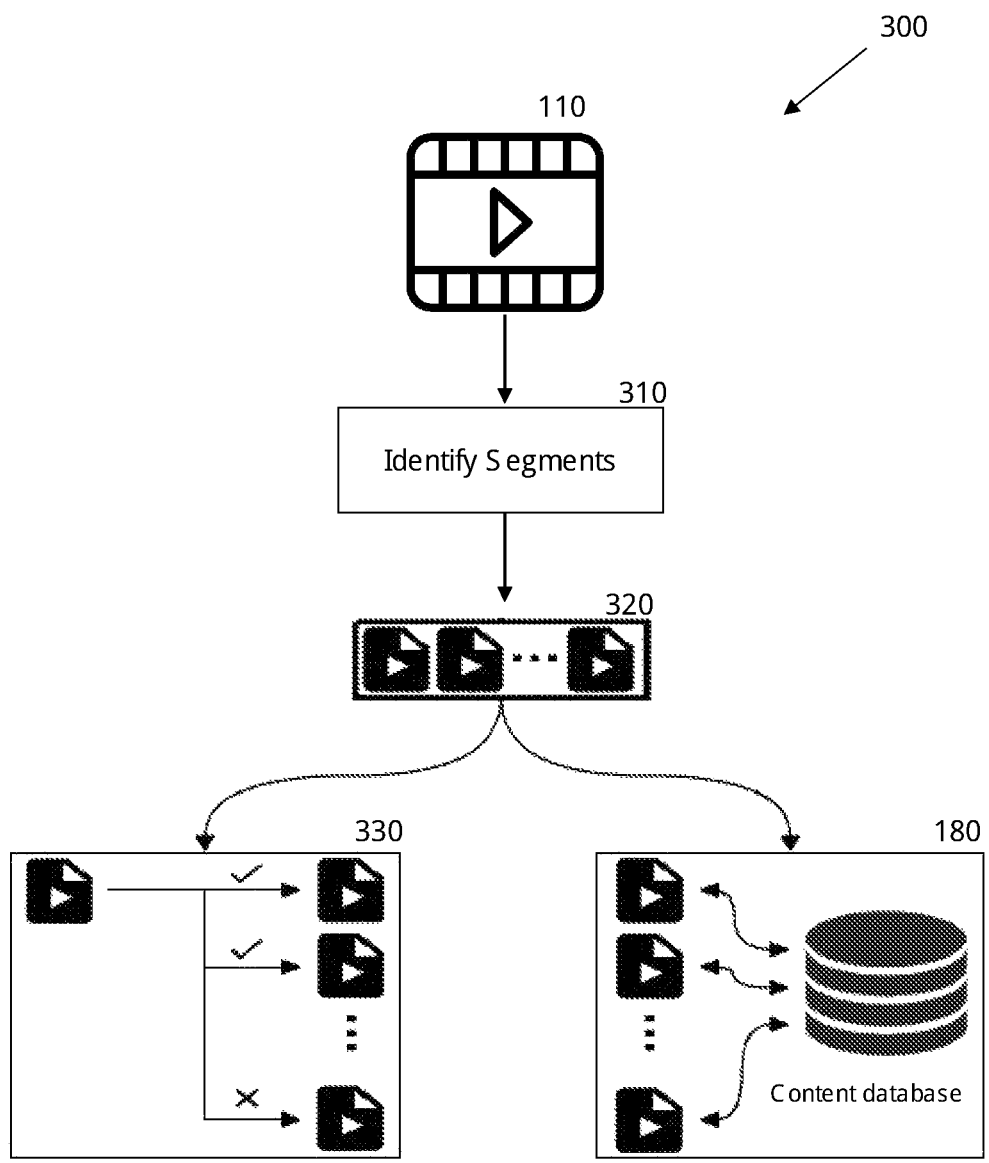
FIG. 4 depicts an overview of a video segment processing program.

FIG. 4 depicts how a segment analysis framework 300 can function. An uploaded video 110 is divided into segments. The segments 310 can be identified and then grouped. Those with intra-segment uniqueness can be combined or grouped together 330. For example, segments of video from a similar setting with similar objects are likely from a similar situation in a video. Further, duplicate segments can be identified 180. When a duplicate segment is identified, it may be discarded/deleted.

In a preferred embodiment, a video is processed in a holistic manner to identify the following:
1) Distinguishable segments or scenes within the video-→This processes the video to discover groups of frames that each correspond to a single logical event.
2) Duplicate segments present across the video→This compares all discovered segments from the above process to identify any pair or group of segments that may not be visually separable from each other (i.e. likely to cause ambiguity during image search).
3) Duplicate segments already present within the Visual Search Platform's Content database→This check evaluates whether a segment or frames within a segment may already be present within the Visual Search Content Database.

After successful video segmentation, each segment can be further transformed into a format suitable for insertion into the content database 180.

Segment Feature Extraction

Upon identification and isolation of valid video segments, it is necessary to package each frame within the segment into an insertion record.

This requires a module embodied by a computer program operating on the system to process each frame within the segment and extract data representing scale and rotation invariant visual features into a vector (such as ORB). Furthermore, each feature vector may be combined with various metadata and identifiers to create a composite data structure for insertion into an content database.

A sample embodiment of such a composite data structure can comprise the following:
  Unique Frame Identifier
  Unique Segment Identifier
  Frame Visual Features
  Metadata (publisher, descriptive tags, etc.)
Database Insertion Once a frame insertion record has been generated, the object is ready for insertion into a content database. Prior to insertion of the frame record to the content database, the content database is queried using the provided content ID. If the content does not exist, there can be a process flow to enable addition of the content as appropriate.

The insertion record can then be transferred to the database for persistence. Upon successful persistence, the database will provide confirmation of this update request and return a response to the computer program responsible for transferring the insertion record. This status update can then be propagated through the framework, indicating completion of that particular frame's process chain.

Figure 5:
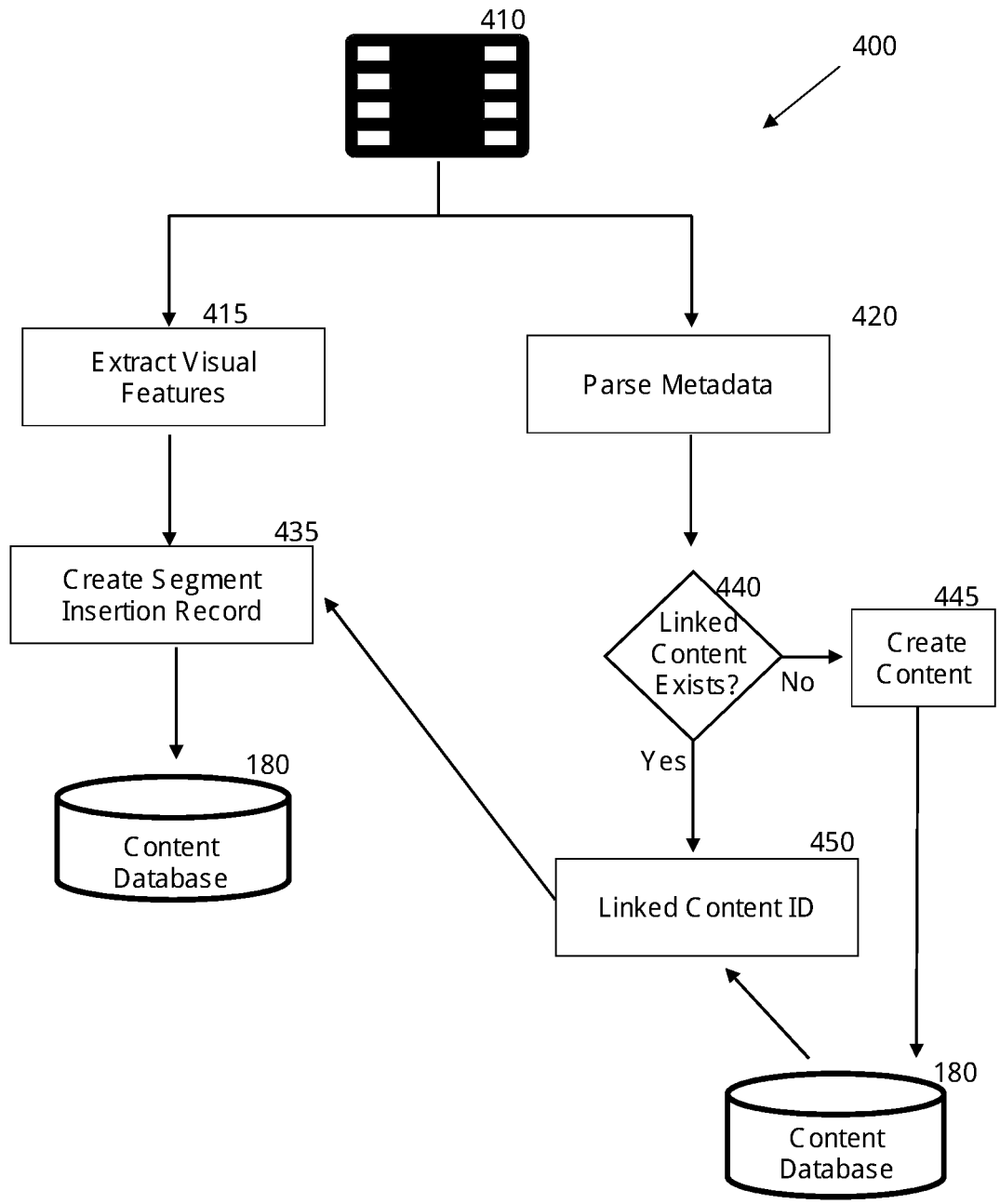
FIG. 5 depicts a video segment insertion program.

FIG. 5 shows an exemplary embodiment of how a frame can be processed and inserted into a content database 180. A processed video segment 410 is analyzed to extract visual features 415 and create a segment insertion record 435.

The system can parse metadata 420 and determine if linked content exists 440. For example, similar content may already be in the database. If so, the system can identify the linked content ID 450 to create a segment insertion record 435 and insert the frame into the content database 180. If no linked content exists, the system can create content 445 for insertion into the content database 180. This approach can be used for video content (i.e. processed frames) as well as image content (i.e. scanned images).

Use Cases
Content Augmentation

The invention can be used to enrich and/or augment media in the form of video. Additionally, subject to analysis and isolation of distinguishable segments within the video, it is possible to link each segment to a different set of content.

As an example, a content creator can upload video content onto the visual search platform using the framework. Multiple segments are identified from the video analysis:
  1) An introductory title sequence. This can be linked to the creator's homepage URL or other locations.
  2) Multiple segments introducing each team member: Each member's video segment can be linked to a URL of their respective bio pages.
  3) A segment describing a product. This segment can be mapped to an augmented reality overlay, which provides a mechanism to virtually interact with the product.
  4) A concluding segment of advantages and disadvantages of the product. This segment can be mapped to an online list of retailers from which the product can be purchased.

In this manner, existing video content can be augmented and enriched by providing a platform for correlation with additional content based on visual search.

Operating Environment

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (I/O) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The I/O devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (I/O) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The I/O devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP),or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C-HF, C#, Action Script, PHP, EcmaScript, JavaScript, JAVA, or 5 HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated but connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment.

What is claimed is:

1. A method of compiling frames from video, saving and indexing the frames in a database comprising the steps of:
   a) obtaining video;
   b) analyzing the video for features;
   c) separating the video into segments based on features, wherein segments are identified by grouping frames that correspond to the same or similar scenes, wherein duplicate segments in the video are removed, wherein segments in the video already present in the database are removed, wherein individual frames in the segments are extracted and visual features are generated for each frame and wherein the segments are annotated with metadata;
   d) analyzing visual features of segments to group segments that share visual features;
   e) analyzing suitability of each frame;
   f) providing an alert if unsuitability is determined;
   g) annotating one or more frames of segments with metadata if suitability is determined, wherein the visual features is extracted into a feature vector, wherein each feature vector is combined with metadata and unique identifiers to create a composite data structure comprising a frame identifier, segment identifier, frame visual features and metadata; and
   h) saving the one or more frames of segments into the database, wherein the database is queried using the composite data structure to determine if linked content exists in the database and either i) creates a segment insertion record and inserts frames into the database or ii) creates content for insertion into the database.

2. The method of claim 1, including an additional step of reducing the frame rate and/or resolution of the video.

3. The method of claim 1, including two additional steps of accessing the database when the user submits a query and matching the query with the one or more frames of segments in the database based on shared features.

4. A computerized system to ingest video comprised of:
   a user interface to upload video to a server;
   a computer program to process the video and extract segments from the video as frames, wherein visual features are generated for each frame and wherein the extracted segments are annotated with metadata,
   wherein segments are identified by grouping frames that correspond to the same or similar scenes, wherein duplicate segments in the video are removed, wherein segments in the video already present in the database are removed;
   a module to process each frame in the segments and extract visual features into a feature vector, wherein each feature vector is combined with metadata and unique identifiers to create a composite data structure comprising a frame identifier, segment identifier, frame visual features and metadata;
   a database to store the extracted segments, wherein the database is queried using the composite data structure to determine if linked content exists in the database and either i) creates a segment insertion record and inserts frames into the database or ii) creates content for insertion into the database;
   wherein the extracted segments are analyzed for adherence to suitability parameters, including image features and resolution; and
   wherein suitability of each frame is analyzed and a response is created if unsuitability of a frame is detected.

5. The computerized system to ingest video of claim 4, including a means for receiving a query and a module for matching the query with one or more video sections in the database based on shared features.

6. A method of compiling images from printed media into a database comprising the steps of:
   a) obtaining printed media;
   b) converting the printed media into digital media;
   c) segmenting the digital media into one or more segments;
   d) detecting text in the one or more segments based on connected contours of edges, wherein the edges are detected by morphology gradient operation, wherein binarization is acheived with the Otsu method, wherein contours are detected by connected components analysis to isolate, words, lines and nearby text, wherein vertical projection of contours detects if the contours contain more than one line, wherein single lines and words are connected and labelled into paragraphs or large single lines in rectangles that represent bounding boxes or contour regions wherein contour regions are filtered and validated using region area, size, ratio of non-zero pixels in the contour regions;
   e) removing areas with text from the one or more segments;
   f) detecting one or more images in the one or more segments;
   g) determining if sufficient features are present to categorize the one or more images;
   h) providing an alert if features are not sufficient;
   i) categorizing the one or more images if features are sufficient; and
   j) inserting the one or more images into the database, wherein the insertion comprises extraction of visual features from the one or more images and creating an insertion response comprising a vector of visual features, segment ID and linked content ID.

7. The method of claim 6, including two additional steps of accessing the database when a user submits a query and matching the query with one or more images in the database by comparing features.

8. The method of claim 6, including an additional step of annotating the one or more images with metadata.

9. A computerized system to ingest documents into a database comprised of:
   a user interface to upload a document to a server;
   a module comprised of logic to process the document and segment the document into one or more segment images;
   a module comprised of logic to remove text from the images based on connected contours of edges, wherein the edges are detected by morphology gradient operation, wherein binarization is acheived with the Otsu method, wherein contours are detected by connected components analysis to isolate, words, lines and nearby text, wherein vertical projection of contours detects if the contours contain more than one line, wherein single lines and words are connected and labelled into paragraphs or large single lines in rectangles that represent bounding boxes or contour regions, wherein contour regions are filtered and validated using region area, size, ratio of non-zero pixels in the contour regions;

a module comprised of logic to detect features in the images;

a module comprised of logic for extracting visual features from the images and creating an insertion response comprising a vector of visual features, segment ID and linked content ID; and a database for inserting the images, wherein detected features are analyzed for validity of the images; and wherein a response is created if invalidity is determined.

10. The computerized system to ingest documents of claim 9, including a means for receiving a query and a module for matching the query with one or more images in the database based on shared features.

* * * * *